United States Patent [19]
Ray

[11] Patent Number: 5,912,521
[45] Date of Patent: Jun. 15, 1999

[54] PERMANENT MAGNET ROTOR WITH SHORTING TURNS

[75] Inventor: Glen Ray, Big Bend, Wis.

[73] Assignee: Allen-Bradley Company, LLC, Milwaukee, Wis.

[21] Appl. No.: 08/967,517

[22] Filed: Nov. 11, 1997

[51] Int. Cl.[6] .......................... H02K 21/12; H02K 11/00; H02K 1/00

[52] U.S. Cl. .................. 310/156; 310/68 B; 310/197

[58] Field of Search ................................... 310/197, 182, 310/68 B, 156, 68 R, 124

[56] References Cited

U.S. PATENT DOCUMENTS 3,466,477  9/1969  Newill ........................................ 310/68
4,506,181  3/1985  Jones et al. ............................. 310/156

Primary Examiner—Nestor Ramirez
Assistant Examiner—Dang Dinh Le
Attorney, Agent, or Firm—Keith M. Baxter; John M. Miller; John J. Horn

[57] ABSTRACT

An inductive element in the form of a shorting turn is added to the rotor of a permanent magnet synchronous motor. Changes in inductive coupling between the rotor and a stationary coil as the rotor rotates permits inductive measurements to be used to deduce rotor position information such as position velocity and acceleration.

11 Claims, 3 Drawing Sheets

5,912,521

PERMANENT MAGNET ROTOR WITH SHORTING TURNS

BACKGROUND OF THE INVENTION

In an AC induction motor, a rotating magnetic field is generated by stator coils to induce current flow and a magnetic field in the rotor. The interaction of the rotor's magnetic field and the stator's magnetic field provide torque to the rotor causing the rotor to rotate.

In order for the stator field to induce current in the rotor the rotor must rotate more slowly than the stator field. This slippage, which is a function of torque, causes the rotational speed of the AC induction motor to be unsynchronized with respect to the frequency at which the stator field is driven.

In contrast, in a synchronous motor, the rotor speed is synchronized to the frequency of the rotating stator field. In a permanent magnet synchronous motor, the rotor field is provided by permanent magnets eliminating the need for rotor windings or the induction of current between the stator and rotor.

When one uses a permanent magnet synchronous motor, it may be desirable to know the position of the rotor with respect to the stator. This position information may be required in order to commutate the stator field or may be used to track total angular displacement or velocity of the rotor for controlling a machine to which the motor is connected. For this purpose, it is known to attach the rotor to an optical encoder or resolver providing angular position information.

The use of such optical encoders or resolvers increases the size and cost of the motor.

BRIEF SUMMARY OF THE INVENTION

The present invention provides a method of determining the position of a rotor in a permanent magnet synchronous motor without the use of external resolvers or encoders or similar such devices. In the invention, a shorting turn is incorporated into the rotor that otherwise would normally contain no windings. Changes in induction between the shorting turn and the stator coils or a special detector winding are used to provide inexpensive and accurate position data.

Specifically, the invention provides a rotor for a synchronous motor having a support shaft with bearing engaging surfaces at its ends for supporting the shaft to rotate about a shaft axis. Permanent magnets are attached to the shaft to provide at least two angularly separated magnetic poles and an electric conductor is attached to the shaft between the ends to provide an annular conduction path. The annular conduction path provides an inductive coupling, to a stationary coil in a plane parallel to the shaft axis, that varies as a function of rotation of the shaft.

Thus it is one object of the invention to provide a simple means of determining rotor position in a permanent magnet synchronous motor. By adding an inductive element to an otherwise inductively undifferentiated permanent magnet rotor, rotor position may be tracked by detecting inductive coupling between the rotor and a stationary sensing coil.

The electrical conductor may be a conductive plate extending along the shaft axis with the permanent magnets positioned on either side of the conductive plate.

Thus it is one object of the invention to provide an extremely simple inductive element that integrates well with the permanent magnets of a two pole rotor. The single plate design may separate the two permanent magnets.

The electrical conductor may be a cage having a first and second conductive end ring surrounding the shaft axis and having conductive bars extending between the first and second conductive end rings, the bars together with the end rings providing the annular conductive paths.

Thus, it is another object of the invention to provide an inductive element on the rotor that presents a series of annular conductive paths to provide increased resolution in position sensing. As the bars rotate with the shaft, their coupling to a stationary coil and their separation from the stationary coil change providing a detectable and varying inductive coupling.

The conductive bars and conductive rings may be portions of a tubular cylinder positioned coaxially about the shaft and the permanent magnets may fit inside the tubular cylinder.

Thus it is another object of the invention to provide an inductive element for an existing permanent magnet rotor that may simply fit over the magnets to provide the features of the present invention.

The foregoing and other objects and advantages of the invention will appear from the following description. In the description, reference is made to the accompanying drawings which form a part hereof and in which they are shown by way of illustration a preferred embodiment of the invention. Such embodiment does not necessarily represent the full scope of the invention, however, and reference must be made therefor to the claims herein for interpreting the scope of the invention.

DETAILED DESCRIPTION OF THE INVENTION

Figure 1:
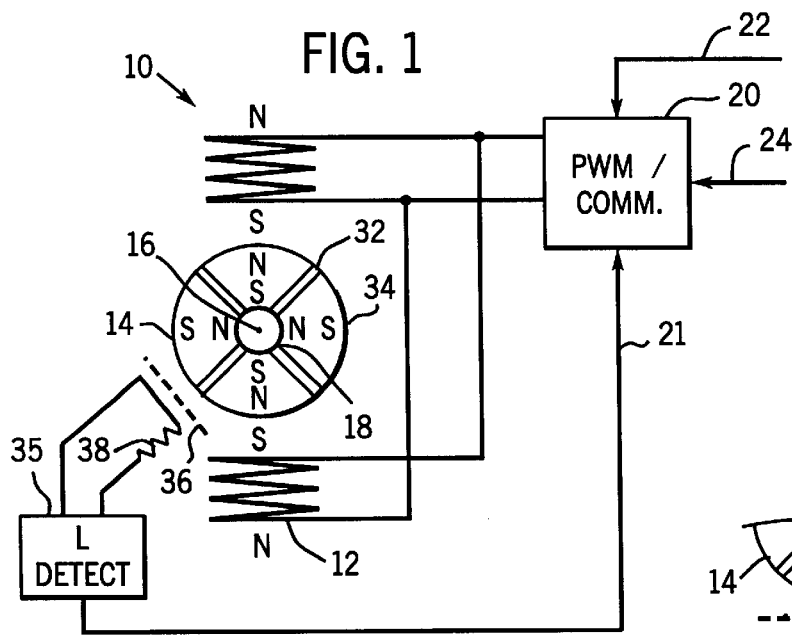
FIG. 1 is a schematic representation of a synchronous permanent magnet motor having a four pole rotor with attached inductive elements and having a separate induction detector coil.

Referring now to FIG. 1, a simplified synchronous permanent magnet motor 10 includes a stator having opposed stator coils 12 positioned about a rotor 14 supported by bearings (not shown) to rotate about a center axis 16.

The stator coils 12 are positioned to generate opposing magnetic flux along a line passing between the stator coils 12 through the axis 16. The flux generated by the stator coil 12 is periodically switched by the action of a commutating circuit 20 such as may include a pulse width modulator well known in the art. The commutating circuit 20 receives a source of power 22 and motor command signals 24 to control the speed and/or torque or other parameters of the motor 10 according to methods well known in the art.

The commutating circuit 20 may also receive position information 21 indicating the position of the rotor as is needed for commutating.

Figure 3:
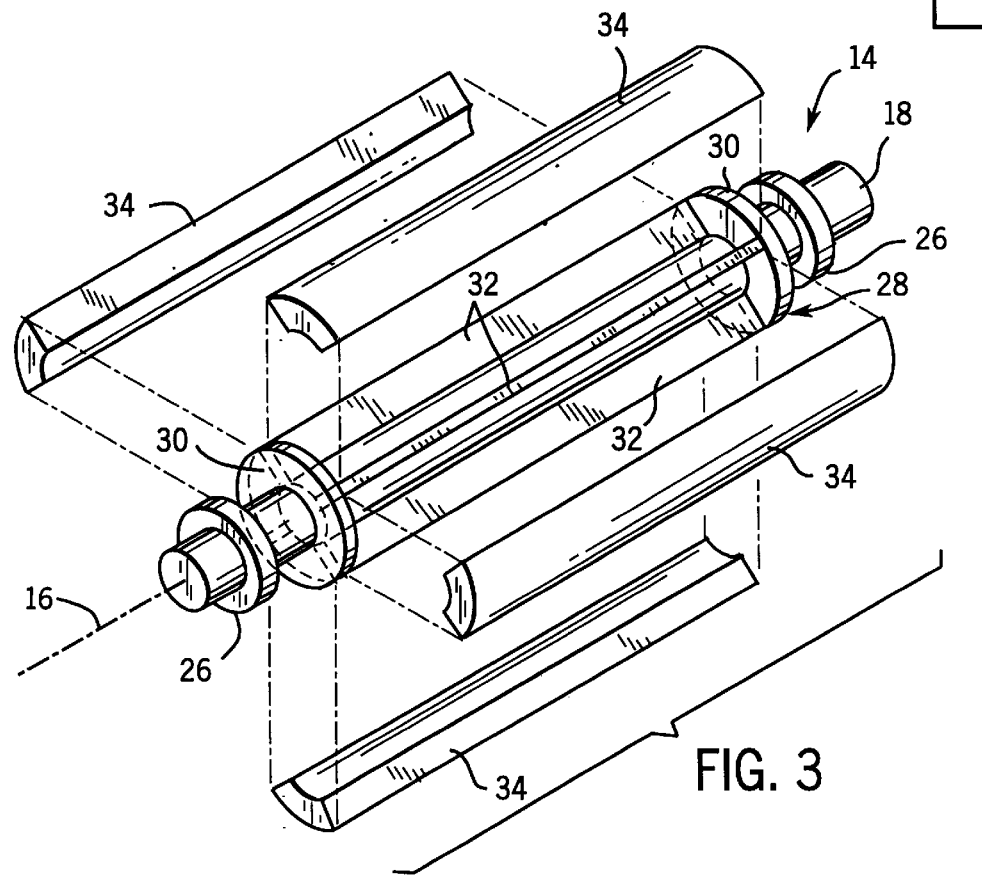
FIG. 3 is an exploded, perspective view of the rotor of FIG. 1 showing conductive vanes and end rings supporting permanent magnet arc segments.

Referring also to FIG. 3, the rotor 14 includes a generally cylindrical shaft 18 journaled to accept bearings 26 at its opposite ends.

An inductive element 28 constructed of a conductive material such as copper or aluminum, is centered between the ends of the shaft 18. The inductive element 28 includes two conductive disks 30 having centered bores receiving the shaft 18 with the disks oriented in a plane perpendicular to the axis 16 of the shaft 18. Spanning the opposed faces of the disks 30 are conductive vanes 32 aligned to extend radially from the shaft 18 and spaced at 90° separation around the shaft 18.

Fitting between the vanes 32 are permanent magnets 34 in the form of 90° arc segment. The magnets 34 together with the vanes 32 form a tubular cylinder fitting coaxially about shaft 18.

As shown in FIG. 1 the magnets 34 are magnetized with opposite radial polarities as one progresses around the shaft 18 so that a changing orientation of flux from the stator coils 12 impresses a torque to the rotor 14 as is understood in the art.

Figure 4:
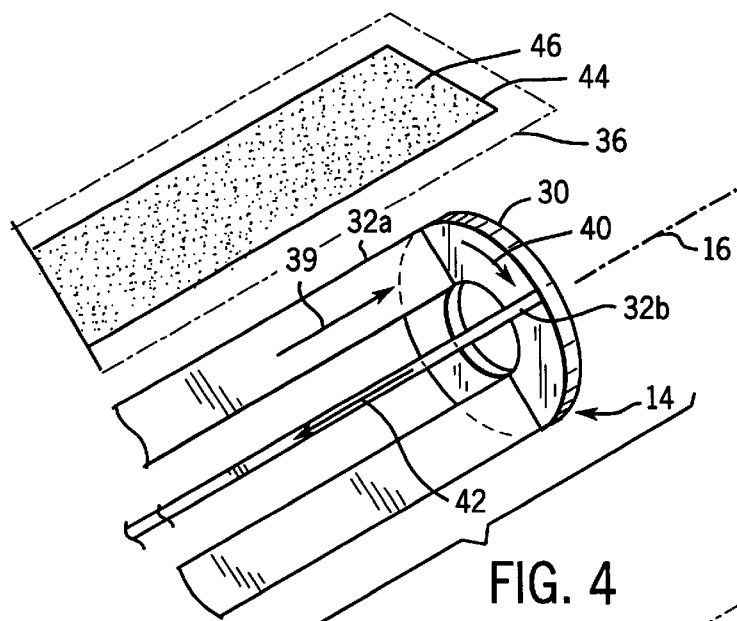
FIG. 4 is a fragmentary detail view of the vanes and conductive end rings of FIG. 3 showing a path of current flow induced by a detector coil in a detection plane, and showing the projected area circumscribed by that current flow when the rotor is in a first position.

Referring now to FIG. 1 and 4, a time varying magnetic field (not shown) may be directed across a detection plane 36 outside the rotor 14 but parallel to its axis 16. The time varying magnetic field will typically be of higher frequency from the torque producing stator field so as to be distinguishable from that field, and may be created by an induction detection coil 38 having an axis directed toward the rotor 14.

When the rotor 14 is in a first position shown in FIG. 4 in which all the vanes 32 are positioned at equal or opposite angles with respect to detection plane 36, the magnetic flux may induce a current flow 39 along a first vane 32A being one of the two equidistant and closest vanes 32 to the detection plane 36. The current 39 then passes along a portion of a first disk 30 as current 40 and returns as current 42 along a second of the vanes 32B of the two closest and equidistant vanes 32 to the detection plane 36. A current loop is completed by current flow of the second disk 30 (not shown).

The current thus follows an annular conduction path that circumscribes a perimeter 44 that may be projected onto detection plane 36 defining an area 46. The extent of the area 46 and the proximity of the current 39, 40 and 42 to the detection plane 36 determines the amount of inductive coupling between the inductive element 28 on the rotor 14 and the induction detection coil 38.

Figure 5:
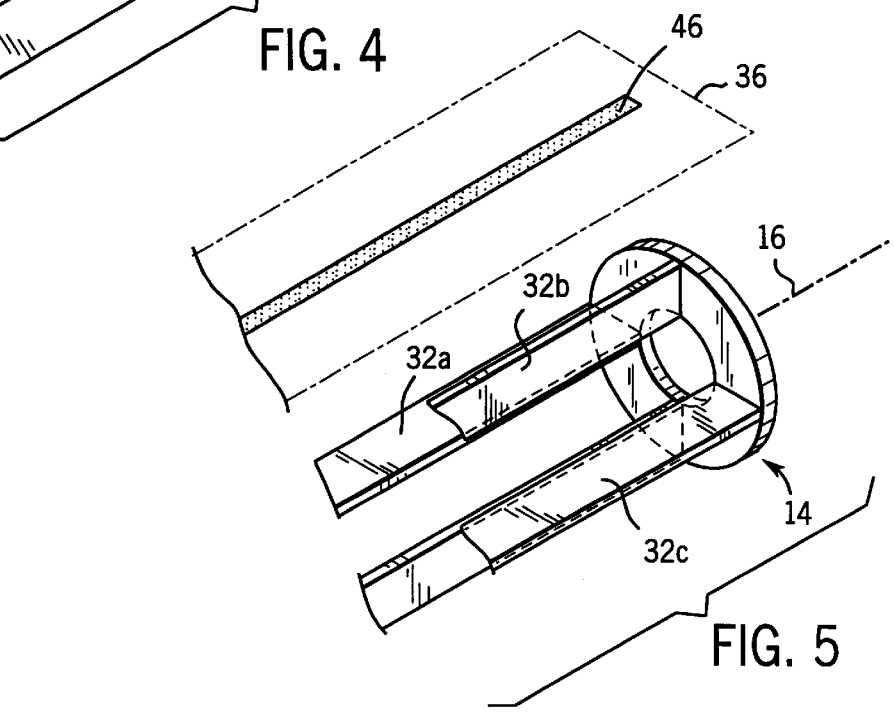
FIG. 5 is a figure similar to that of FIG. 4 showing the rotor in a second position and a much reduced projected area.

As shown in FIG. 5 a 45° rotation of the rotor 14 will bring vane 32B to perpendicular relationship with detection plane 36 significantly reducing the conductive area 46 as would support inductive coupling with the induction detection coil 38.

Figure 8:
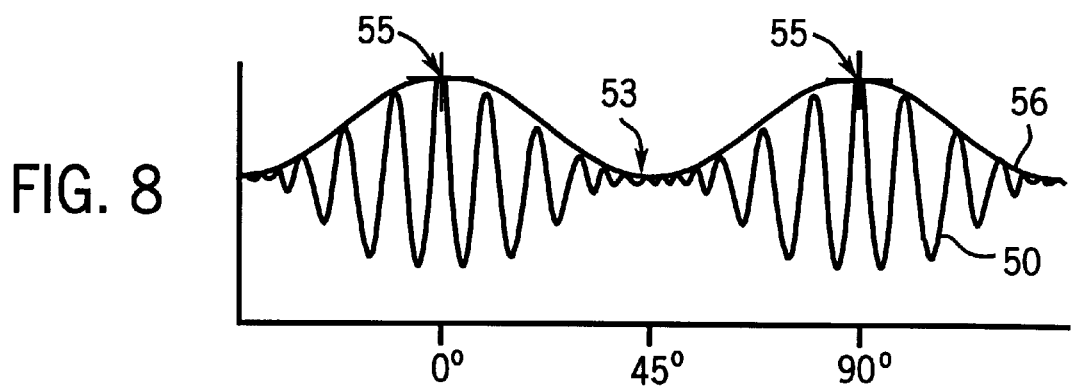
FIG. 8 is a representation of a varying amplitude of a driving signal from an inductance detector coil showing the detection of varying inductance at different rotor positions.

Referring momentarily to FIG. 8, a high frequency signal 50 may be provided from a high impedance source of an inductance detector 35. The inductance detector 35 may be attached to the induction detection coil 38 to produce the time varying magnetic field described above. The high frequency signal 50 will exhibit greater attenuation at point 53 when the rotor is in the position shown in FIG. 4 than at point 55 when the rotor is in to position shown in FIG. 5. The attenuation of point 53 is caused by the inductive coupling to the rotor 14 when the rotor is in the position shown in FIG. 4 such inductive coupling drawing power from the induction detection coil 38 and attenuating it in the internal resistance of the conductors of vanes 32A, 32B and disks 30. In contrast, when the rotor is in the position of FIG. 5, the vane 32B provides relatively little conductive area aligned with the detection plane 36.

A demodulated signal 56 derived from signal 50 may be examined for peaks and troughs to indicate the position of the rotor through inductance detector 35 according to techniques well known in the art.

Figure 6:
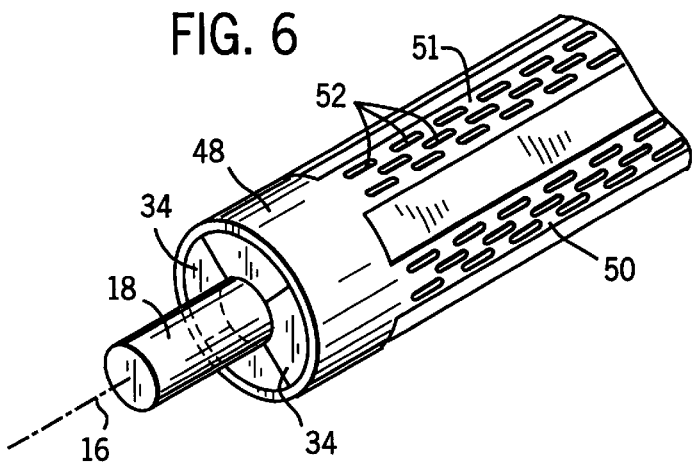
FIG. 6 is a fragmentary perspective end view of an alternate rotor design in which the vanes and end rings are part of a hollow cylinder fitting outside of the magnets of the rotor.

Referring now to FIG. 6 in a second embodiment of the invention, the magnets 34 fit adjacent to each other and the shaft 18 to form a cylinder. The cylinder is surrounded by a cage formed of tubular end rings 48 and connecting strips 51 all being portions of a single tubular cylinder coaxial and adjacent to the outer surface of the magnets 34 to fit within the stator bore. The tubular end rings 48 serve the same function of disks 30 fitting over the magnets 34 at opposite ends of the shaft 18. The tubular end rings 48 are joined by connecting strips 51 extending generally parallel to the axis 16 along the outer surface of the magnets 34 again being equally spaced at 90° intervals around axis 16. Axial slots 52 may be cut in the strips 51 to reduce eddy currents in the strips when the strips 51 are closest to the detection plane 36 (not shown in FIG. 6) as would be the case in FIG. 5. The slots thus reduce the effective area 46 projected to the detection plane 36

Figure 7:
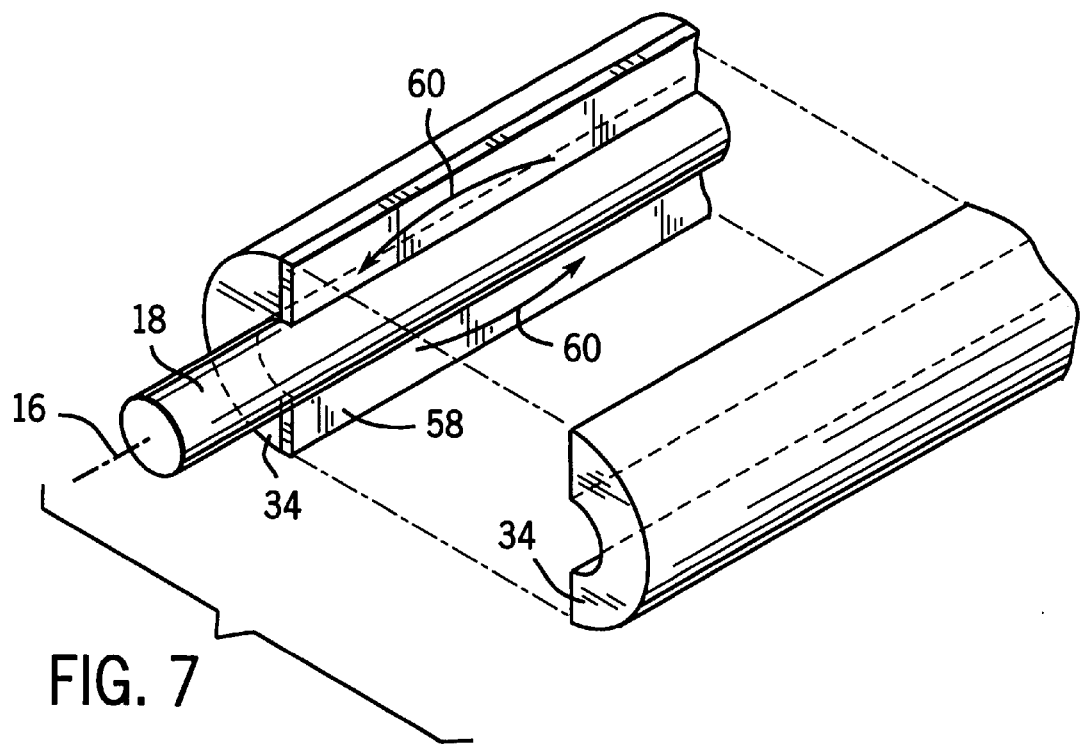
FIG. 7 is a fragmentary perspective end view of a further alternate rotor showing a simplified in which the function of the vanes and end rings of FIGS. 3 and 6 are implemented in a single conductive plate bifurcating the rotor.

Referring now to FIG. 7, in yet a third embodiment invention, two magnets 34 each comprises half of a generally cylindrical magnet assembly providing the two poles of a two pole rotor. The halves fit about the shaft 18 sandwiching between them a single conductive plate 58 extending through the shaft 18 to bisect it along axis 16. The single conductive plate 58 provides a continuous conductive surface that may support current flows 60 of an annular conduction path. For the embodiment of FIG. 7 when the conductive plate 58 is parallel to the detection plane 36, maximum inductive coupling is had and when the conductive plate 58 is perpendicular to the detection plane 36 minimum inductive coupling is had.

Referring to FIGS. 1 and 8, if the position information generated by the inductive element 28 is needed for commutating the motor 10, the periodicity of the demodulated signal 56, i.e., the periodicity of the strips 51 or vanes 32 or halves of the conductive plate 58, should correspond to the number of poles of the motor.

Figure 2:
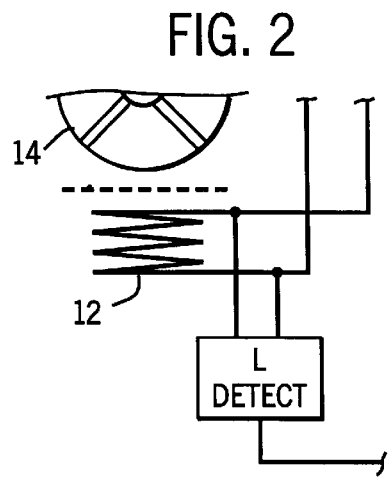
FIG. 2 is a fragmentary, detail view of an alternative embodiment of FIG. 1 replacing the separate induction detector coil with a stator coils.

Referring now to FIG. 2 the inductance detector 35 need not have its own induction detection coil 38 but may make use of a stator coil 12 by superimposing the high frequency waveform 50 (as shown in FIG. 8) on the normal stator signal. In this way the present invention may be further simplified in structure.

The above description has been that of a preferred embodiment of the present invention. It will occur to those that practice the art that many modifications may be made without departing from the spirit and scope of the invention.

For example, the embodiment of FIG. 7 may be simply modified to work with the four pole magnet arrangement of FIG. 3. Conversely the cage structure FIG. 6 may be used with the two magnet assembly of FIG. 7. Further the structure of FIGS. 3 and 6 may be modified to provide for four electrically independent conductive paths so as to reduce unintended induction, for example through vanes 32A and 32C parallel to detection plane 36 as shown in FIG. 5. In order to apprise the public of the various embodiments that may fall within the scope of the invention, the following claims are made.

I claim:

1. A rotor position detection system for a synchronous motor comprising:

a support shaft having bearing engaging surfaces at a first and second end for supporting the shaft to rotate about a shaft axis;

permanent magnets attached to the shaft to rotate therewith, the permanent magnets providing at least two angularly separated magnetic poles;

a stationary coil extending in a plane parallel to the shaft axis; and an electrical conductor providing an annular conduction path, the electrical conductor attached to the shaft between the first and second ends to provide an inductive coupling to the stationary coil that varies as a function of position of the shaft;

whereby the inductive coupling provides a position signal indicating the position of the rotor with respect to the stationary coil.

2. The rotor of claim 1 wherein the electrical conductor is a conductive plate extending along the shaft axis with the permanent magnets positioned on either side of the conductive plate.

3. The rotor of claim 1 wherein the electrical conductor is a cage having first and second conductive end rings surrounding the shaft axis having conductive bars extending between the first and second conductive end rings, the bars together with the end rings providing annular conductive paths.

4. The rotor of claim 3 wherein the conductive rings are circular rings concentric with the shaft axis and wherein the conductive bars attach to the conductive rings at points spaced at equal angles about the conductive rings, and wherein the conductive bars are straight and substantially parallel to the shaft axis.

5. The rotor of claim 3 wherein the conductive bars extend radially from the shaft axis and are laminated between the permanent magnets.

6. The rotor of claim 3 wherein the conductive bars and conductive rings are portions of an annular cylinder positioned coaxially about the shaft and wherein the permanent magnets fit inside the annular cylinder.

7. The rotor of claim 1 wherein the electrical conductor is selected from the group consisting essentially of copper and aluminum.

8. A synchronous motor providing rotor position information comprising:

a stator assembly including at least one induction coil surrounding a stator bore;

a shaft held within the stator bore on bearings to rotate about a shaft axis;

permanent magnets attached to the shaft to rotate therewith, the permanent magnets providing at least two angularly separated magnetic poles;

an electrical conductor attached to the shaft to rotate therewith in the stator bore, the conductor providing an annular conduction path having a varying inductive coupling with the induction coil with rotation of the rotor;

an induction detection circuit electrically attached to the induction coil to provide an output signal indicating relative shaft position based on induction between the induction coil and the electrical conductor.

9. The synchronous motor of claim 8 wherein the induction coil is a stator coil.

10. The synchronous motor of claim 8 wherein the stator includes stator coils driving the permanent magnets and wherein the induction coil is independent of the stator coils of the stator assembly.

11. The synchronous motor of claim 8 wherein the stator includes stator coils driving the permanent magnets of the rotor and further including a commutating circuit receiving the shaft rotor position signal from the induction detection circuit to control a switching of the stator coils.

\* \* \* \* \*